(No Model.)

C. F. JANES & C. P. BENNS.
INSTRUMENT FOR PLATTING STADIA NOTES.

No. 581,559. Patented Apr. 27, 1897.

Plan.

Elevation.

Section.

WITNESSES:
A. E. McLean
Herbert A. Rice

INVENTORS
Charles F. Janes
Charley P. Benns
BY
Walter B. Vincent
ATTORNEY.

UNITED STATES PATENT OFFICE.

CHARLES F. JANES AND CHARLEY P. BENNS, OF PROVIDENCE, RHODE ISLAND.

INSTRUMENT FOR PLATTING STADIA NOTES.

SPECIFICATION forming part of Letters Patent No. 581,559, dated April 27, 1897.

Application filed December 17, 1896. Serial No. 616,077. (No model.)

*To all whom it may concern:*

Be it known that we, CHARLES F. JANES and CHARLEY P. BENNS, of Providence, in the State of Rhode Island, have invented a new and useful Instrument for Platting Stadia Notes; and we do hereby declare that the following specification, taken in connection with the drawings making a part of the same, is a full, clear, and exact description thereof.

Figure 1:
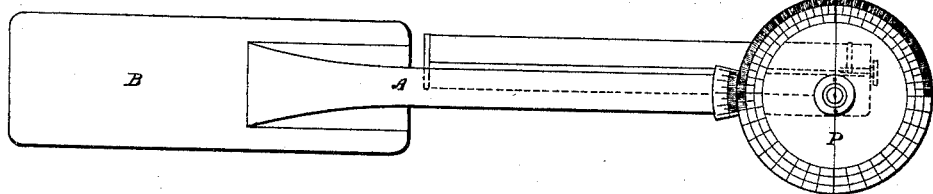
Figure 2:
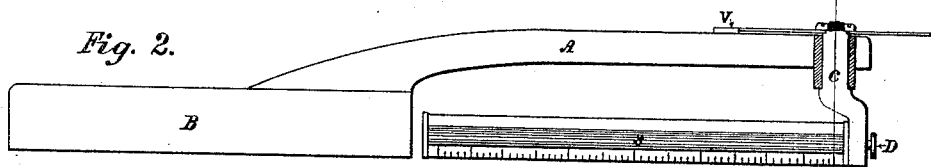
Figure 3:
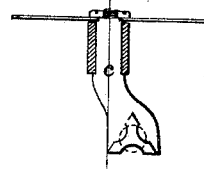

Figure 1 is a plan of our device. Fig. 2 is an elevation of the same. Fig. 3 is a section of shaft.

The object of our invention is to facilitate the platting of points located in the field, by means of the stadia or other means, where there are a number of points located from one station; and it consists in the device hereinafter described by which a scale may be swung around a center.

Our device consists of a heavy base B, from which projects an arm A. A shaft C passes through the end of the arm A, carrying at its upper end a protractor P, the latter being used in connection with a vernier V. At the bottom of the shaft is a scale S, attached by means of a set-screw D or in any other desired manner. The shaft C is bent and the scale so arranged with reference thereto that the zero-point of the scale is exactly under and in line with the center of the shaft C, as shown in Fig. 2. The shaft C is also bent in a direction at right angles to that shown on Fig. 2, so as to bring the edge of the scale S exactly under and in line with the center of the shaft C.

In operating our device the zero of the protractor is first placed at the zero of the vernier. Then the zero of the scale is placed at a point on the paper representing the station from which the points were located, the edge of the scale being placed along the line representing that from which the angles were taken. The scale is now turned to the right or left till the angle read on the protractor and vernier corresponds with that taken in the field. The zero of the scale being in line with the axis on which the protractor turns will remain at the station on the paper in whatever direction and to whatever extent the scale may be turned. The distance read on the stadia-rod or otherwise determined may be at once pointed off on the paper.

With this device operating as described a scale may be swung around a center and a distance scaled off in any direction without shifting or resetting the instrument.

What we claim as our invention, and desire to secure by Letters Patent, is—

1. In a platting device, the combination, with a base provided with a projection, said projection being provided with a vernier, of a protractor, and a scale pivotally secured below the projection, the zero-point of which is in a line with the center of the protractor, substantially as set forth.

2. In a platting device, the combination, with a base provided with a projection, the free end of which is provided with a vernier, of a bent shaft journaled with its axis at the center of the vernier, a protractor secured to the upper end of the shaft, and a scale secured to the lower end of the shaft with its zero-point in a vertical line with the axis of the shaft, substantially as set forth.

3. In a platting device, the combination, with a base provided with a projection, the free end of which is provided with a vernier, of a shaft journaled in the end of the projection, the lower end of which is beyond the axis of the upper part, a protractor secured to the upper end of the shaft, and a scale secured to the lower end of the shaft with its zero-point in a line with the axis of the shaft, substantially as set forth.

4. In a platting device, the combination, with a base, of a projection extending from the upper surface thereof, the free end of the projection being provided with a vernier, said vernier being located above the bottom of the base, a shaft journaled in the outer end of the projection, a protractor secured to the upper end of the shaft, and a scale pivotally secured to the lower end of the shaft, the length of the scale being less than the projection whereby its free end may pass between its pivotal point and the base, substantially as set forth.

CHARLES F. JANES.
CHARLEY P. BENNS.

Witnesses:
WALTER B. VINCENT,
A. E. MACLAINE.